Feb. 27, 1951     C. E. BROWN     2,543,352
CAMERA TRIPOD HEAD
Filed Jan. 20, 1948     2 Sheets-Sheet 1
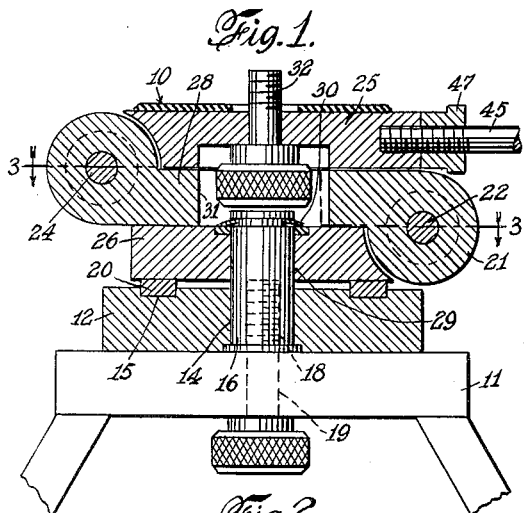
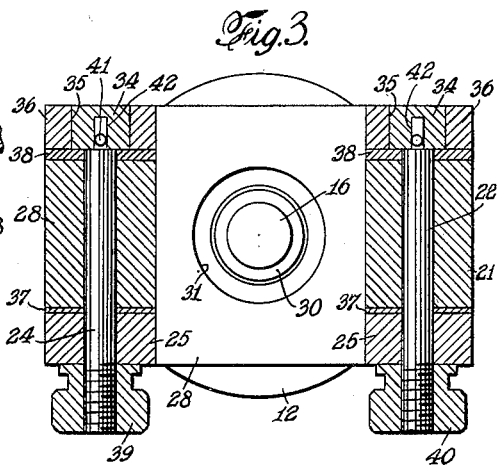
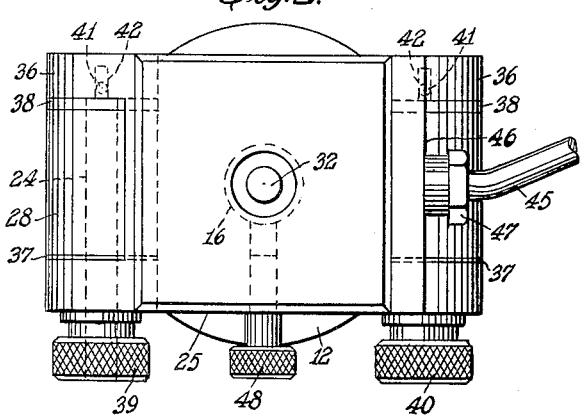
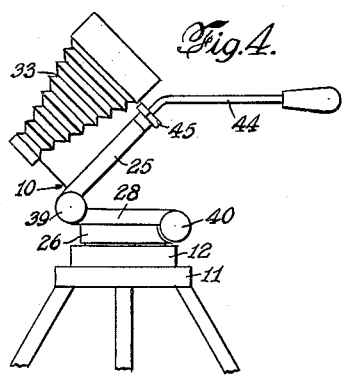
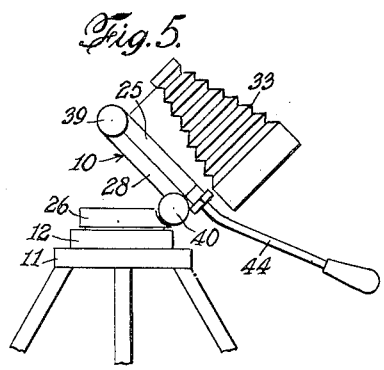
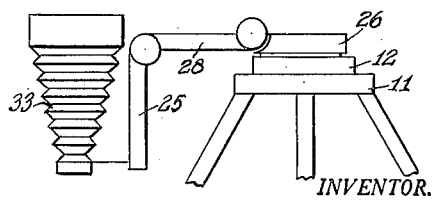
INVENTOR.
CHARLES E. BROWN
BY Peter M. Boesen
ATTORNEY.

Feb. 27, 1951       C. E. BROWN       2,543,352
CAMERA TRIPOD HEAD
Filed Jan. 29, 1948       2 Sheets-Sheet 2
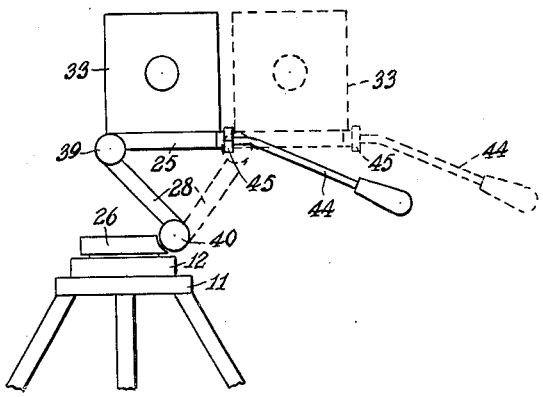
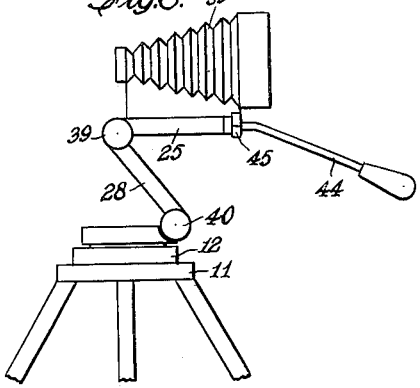
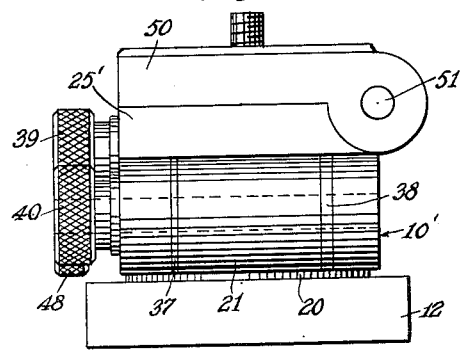
INVENTOR.
CHARLES E. BROWN
BY Peter M. Boesen
ATTORNEY.

Patented Feb. 27, 1951

2,543,352

UNITED STATES PATENT OFFICE 2,543,352

CAMERA TRIPOD HEAD

Charles E. Brown, New York, N. Y.

Application January 20, 1948, Serial No. 3,323

3 Claims. (Cl. 248—183)

This invention relates to camera tripod heads and to means for holding a camera, such as a motion picture or still camera, in a desired position by adjustable friction means, and more particularly to apparatus and devices for holding the camera by friction means which will not seize or gall and which will permit forced movement for settings of position.

One object of the invention is to provide an improved device or apparatus of this kind which will enable maximum angular movement in the horizontal and vertical planes.

Another object is to provide hinge joints and base pivot provided with means for adjusting and maintaining such friction therein so as to hold camera in any selected position, yet permit easy repositioning at will, and to minimize transmission to the camera of body tremors or irregularities of repositioning forces. A readily detachable, or attachable, handle is provided, of such position, form and dimensions as to contribute to ease and accuracy of camera motion control during tilting or horizontal swinging.

Other objects of the invention are to provide an improved device of this kind which permits maximum vertical movement without danger of the camera toppling over when unclamped.

Additional objects of the invention are to effect simplicity and efficiency in such apparatus and to provide an extremely simple device or apparatus of this kind which is economical, durable, and reliable in operation, and economical to manufacture and install.

Still other objects of the invention will appear as the description proceeds; and while herein details of the invention are described in the specification, the invention is not so limited and many and various changes may be made without departing from the scope of the invention.

The inventive features for the accomplishment of these and other objects are shown herein in connection with a camera mount which briefly stated, includes a multi-action hinge having a plurality of plates adapted to lie one upon the other and each oscillatory with respect to the others and independently thereof. The lowermost plate is restrained against vertical movement and the upper-most is adapted to be secured to the camera. Friction means at the joints between the plates are provided to selectively restrain movement of the joints.

In the accompanying drawing, showing, by way of example, two of many possible embodiments of the invention:

Figure 1 is a fragmental transverse vertical sectional view, partly in elevation, showing the mount, the section being taken substantially on the line 1—1 of Figure 2, looking in the direction of the arrows of said line.

Figure 2 is a plan showing the mount.

Figure 3 is a fragmental transverse horizontal sectional view, partly in elevation, showing the joint knuckles, the section being taken substantially on the line 3—3 of Figure 1 looking in the direction of the arrows of said line.

Figures 4 through 8 are schematic representations of various modes of use of the mount, and Figure 9 is an end elevation showing a modification of the mount.

In Figures 1 through 8 my camera mount 10 for a tripod 11 comprises, in combination, a flat circular base 12 having a central hole 14 therethrough and an annular groove 15 in the upper face thereof and preferably remote from the hole. A stub shaft 16 is secured fast in said hole and projects upwardly, said shaft is provided with a threaded bore 18 open at the bottom adapted to receive a screw 19 for attaching the base to the tripod. A washer 20 of frictional material such as leather is disposed in the groove to project above the upper face of the base. On said stub shaft and against the upper face of the washer is mounted a three-plate double action hinge 21 having constantly parallel pintles 22 and 24 wherein each outer plate 25 and 26 may oscillate relative to the intermediate plate 28 at least 180° and independently of the other outer plate, and each outer plate when the hinge is completely closed is adapted to lie flat against the respective faces of the intermediate plate. The lower plate 26 of said outer plates is provided with a bearing bore 29 therethrough, in its mid-portion adapted to receive the upper end of the stub shaft whereby the plate 26 and the hinge as a whole may rotate 360° in a horizontal plane. Retaining means, such as a force-fit washer or snap ring 30, is mounted on the end of the stub shaft for holding the lower plate on the shaft.

The intermediate plate 28 is free from structure in its mid-portion as at 31, so as to enable it to lie flat on the lower plate, and to provide space for a screw 32 passing through the upper plate and adapted to secure a camera 33 thereon. The pintles of the joints are in the form of bolts each having a head 34 free to pass axially through the bore 35 of one of the outer knuckles such as at 36 at each joint as in Figure 3 and friction washers 37 and 38 are disposed intermediate the inner and outer knuckles.

Adjusting nuts 39 and 40 are provided on the pintle bolts 24 and 22 respectively. Unless the pintle bolt heads are non-rotatable in the outer knuckles in which they are received, means such as a detent pin 41 engaged in a longitudinal slot 42 in each head are provided.

As the adjusting nut is tightened, the head 34 imposes no clamping strain on the knuckle 36 but the hinge action is restrained due to the friction at the faces of the washers 37 and 38. Preferably the washer 38 is strong enough to prevent deformation under pressure of the screw head 34. It will be noted that the head 34 bears against the washer 38.

A lever 44 having a bent shank 45 is threaded into the swinging end face 46 of the upper plate and provided with a lock nut 47 on the threaded portion of the shank for securing the lever in selected rotary position as the shank is screwed into the plate.

In operation, when the camera 33 is secured onto the hinge, the two may be rotated horizontally relative to the base 12 secured to the tripod 11. When an ordinary low forward shot is desired the camera may be tipped forward with the upper plate hinging on pintle 24 as shown in Figure 4, while an elevated shot may be made as shown in Figure 5 with the upper and intermediate plates hinging on the lower plate. When a "straight down" shot is desired the direction of the camera on the top plate may be reversed, and the lower and intermediate plates may be opened to lie in substantially the same plane so that the upper plate and camera will overhang the tripod as shown in Figure 6. Obviously the length of the plates may be chosen so that even large cameras will clear the tripod if necessary.

When stereoscopic pictures are desired, the camera may be mounted as in Figure 7 and then off-set to correspond to the interpupillary distance as shown. Also the camera may, by my mount, be adjusted normally to the axis of the tripod so as to obtain sharp focus for close-ups or to locate the center of the lens in line with the axis for taking panoramic shots as in Figure 8.

Of course the friction on the knuckles may be varied by use of the adjusting nuts so that the camera may be set in any desired position. Especially when light weight cameras are used, the friction required at the hinge joints to maintain the camera in position may be so slight that the adjustment of the nuts need not be disturbed. The camera can then be directed by the lever 44 to the desired position where it will remain. It will be noted that even though the friction of the hinge be nil for a camera of ordinary weight there is no danger of camera toppling over during tilting if the center of gravity of the camera is near the vertical plane midway between the pintles.

It is preferable that all moving parts in contact with each other be of dissimilar material so as to obtain uniform friction without seizure at the contact surface. For example the plates may be of aluminum, the pintle bolts of steel, and the friction washers 37 and 38 of steel or any suitable material.

A set screw 48 passing radially through the lower plate 26 and adapted to engage against the stub shaft 16 may be employed for locking the hinge against panoramic rotation. A layer of rubber 49 or other suitable resilient friction material may be secured on the top face of the upper plate to facilitate firm connection of the camera to the hinge.

The lock nut 47 on the lever shank 45 permits adjustability of the lever to various positions such as for right or left handed operators, extreme tilting (suggested in Figures 4 and 5) and at the same time permits of firmly securing the shank to the hinge with only one threaded hole.

While in the drawing an embodiment is shown wherein the hinge plates may swing at least 180° relative to each other it is obvious that it may not always be necessary for the range of movement to be so great. However, I prefer that the outer plates swing independently of each other.

In a modification of the invention the mount 10' substantially as described supra, may be provided (Figure 9) with an additional upper leaf or plate 50 hinged to the plate 25' similar to the plate 25 but provided with side knuckles carrying a pintle 51 in a plane perpendicular to the pintles 22 and 24. The joint at pintle 51 is similar to those at the aforementioned pintles and enables easy canting of the camera for taking pictures on the bias, if desired.

It will be noted that in both forms of the invention there is never any danger of the camera toppling over as long as the center of gravity of the camera and plates is inner of vertical planes passing through the axis of the pintles, regardless of the friction in joints.

The plate 50 may be provided with a screw opening for mounting the camera as described of plate 25, as well as tapped holes for receiving the end of the lever shank.

It is obvious that changes may be made in the form, construction and arrangement of the several parts, as shown, within the scope of the appended claims, without departing from the spirit of the invention, and I do not, therefore, wish to limit myself to the exact construction shown and described herein.

What I claim as new, and desire to secure by Letters Patent of the United States, is:

1. A camera mount for a tripod comprising, in combination, a flat base having a stub shaft secured fast thereon and projecting upwardly; a three-plate double acting hinge having parallel pintles and wherein each outer plate may oscillate relative to the intermediate plate at least 180° and independently of the other outer plate and each outer plate when the hinge is completely closed adapted to lie flat against the respective faces of the intermediate plate, the lower of said outer plates being provided with a bearing bore therethrough in its midportion receiving the upper end of the stub shaft; retaining means mounted on the end of the stub shaft for holding the lower plate on the shaft; a screw passing through the upper plate and adapted to secure a camera thereon; a lever having a bent shaft threaded into the swing end face of the upper plate, and a lock nut on the threaded portion of the shank for securing the lever in selected rotary position as the shank is screwed into the plate.

2. A camera mount for a tripod comprising, in combination, a flat base having a stub shaft secured fast thereon and projecting upwardly; a three-plate double acting hinge having parallel pintles and wherein each outer plate may oscillate relative to the intermediate plate at least 180° and independently of the other outer plate and each outer plate when the hinge is completely closed adapted to lie flat against the respective faces of the intermediate plate, the lower of said outer plates being provided with a bearing bore therethrough in its midportion receiving the upper end of the stub shaft; retaining means mounted on the end of the stub shaft for holding the lower plate on the shaft; a screw passing through the upper plate and adapted to secure a camera thereon, the pintles of the joints being in the form of bolts having heads free to pass axially through the bore of one of each of the outer knuckles; friction washers intermediate the inner and outer knuckles; means for preventing rotation of the heads of said bolts relative to the outer knuckles, and adjusting nuts on each bolt.

3. A camera mount for a tripod comprising, in combination, a flat circular base having a central hole therethrough and an annular groove in the upper face thereof and remote from the hole; a stub shaft secured fast in said hole and projecting upwardly and provided with a threaded bore open at the bottom adapted to receive a screw for attaching the base to the tripod; a washer of leather friction material disposed in the groove and projecting above the upper face of the base; a three-plate double acting hinge having parallel pintles, one of the outer plates of said hinge being provided with a bearing bore therethrough in its midportion receiving the upper end of the stub shaft; retaining means mounted on the end of the stub shaft for holding said outer plate on the shaft, the intermediate plate of the hinge being free from structure in its midportion and adapted to lie flat on said outer plate; a screw passing through the other outer plate and adapted to secure a camera thereon, a lever having a bent shaft threaded into the swing end face of the upper plate, and a lock nut on the threaded portion of the shank for securing the lever in selected rotary position as the shank is screwed into the plate.

CHARLES E. BROWN.

REFERENCES CITED

The following references are of record in the file of this patent:

UNITED STATES PATENTS

| Number | Name | Date |
|---|---|---|
| 439,098 | Blake | Oct. 28, 1890 |
| 1,006,693 | Shaw | Oct. 24, 1911 |
| 1,758,240 | Roach | May 13, 1930 |
| 2,054,614 | Copony | Sept. 15, 1936 |
| 2,318,910 | Zucker | May 11, 1943 |
| 2,449,492 | Lang | Sept. 14, 1948 |